United States Patent [19]

Tarantino

[11] Patent Number: 4,507,326

[45] Date of Patent: Mar. 26, 1985

[54] STRATIFIED CHROMATICALLY DISTINCT SHERBET CONFECTION AND METHOD OF MAKING SAME

[75] Inventor: Jeffrey W. Tarantino, Wilbraham, Mass.

[73] Assignee: Friendly Ice Cream Corporation, Wilbraham, Mass.

[21] Appl. No.: 508,257

[22] Filed: Jun. 27, 1983

[51] Int. Cl.$^3$ .......................... A23G 9/04; A23G 9/28
[52] U.S. Cl. .................... 426/101; 426/249; 426/565; 426/515; 426/512; 426/516; 426/524
[58] Field of Search ............... 426/249, 565, 566, 567, 426/515, 516, 518, 524, 512, 100, 101

[56] References Cited

U.S. PATENT DOCUMENTS

| | | | |
|---|---|---|---|
| 1,429,405 | 9/1922 | Carter et al. | 426/249 |
| 1,839,719 | 1/1932 | Walter | 426/249 |
| 2,576,842 | 11/1951 | Lehner | 426/249 |
| 4,310,559 | 1/1982 | Mita et al. | 426/249 |
| 4,340,994 | 7/1982 | dos Santos et al. | 426/249 |
| 4,399,154 | 8/1983 | Puglia | 426/249 |

OTHER PUBLICATIONS

Arbuckle, W. S., Ice Cream, 3rd Ed., Avi Pub. Co., Westport Conn., 1977, pp. 303–319.

*Primary Examiner*—Jeanette Hunter
*Attorney, Agent, or Firm*—Nims Howes Collison & Isner

[57] ABSTRACT

A selectively shaped, chromatically distinct stratified sherbet confection and method of making the same. Partially prefrozen chromatically distinct sherbert extruded from a multichambered extrusion head and subjected to extremely low temperatures, preferably by spraying the surface of the extrusion with liquid nitrogen, to form a structural cohesive external rigid crust, which contributes to the stability of the extrusion's shape during subsequent operations upon it.

6 Claims, 6 Drawing Figures

STRATIFIED CHROMATICALLY DISTINCT SHERBET CONFECTION AND METHOD OF MAKING SAME

This invention relates to selectively shaped sherbet confections and more particularly to selectively shaped chromatically distinct stratified sherbet confections and to methods for making the same.

BACKGROUND OF INVENTION

Selectively shaped ice cream confections, including those incorporating a plurality of extruded chromatically distinct strata therein, have long been available for retail purchase and consumption. The formation of such products, due to the ready extrudability of ice cream over a relatively wide temperature range and attendant capability of retaining its shape for an appreciable period of time following extrusion, has posed no particular fabrication problems. However, attempts to utilize such fabrication processes for the commercial production of selectively shaped sherbet confections that incorporate a plurality of extruded strata therein have been unsuccessful due to the basically different physical characteristics of sherbet. More specifically sherbet, under conditions that permit its extrusion, is not sufficiently self sustaining to effectively retain its extruded shape for the necessary periods of time to further commercially process the extruded product.

SUMMARY OF THE INVENTION

This invention may be briefly described as a selectively shaped, chromatically distinct stratified sherbet confection and to a method of making such confection. In its broad aspects, the subject invention includes the immediate subjection of a composite extruded sherbet product to an extreme low temperature environment to rapidly modify its physical characteristics to an extent to substantially preserve the external and the internal configurations of the composite product so as to permit a continuance of commercial fabrication procedures thereon preparatory to final freezing operations. In a somewhat narrower aspect, the subject invention includes the spraying of the exposed exterior surface of the extruded sherbet product with water immediately following extrusion and prior to its exposure to the extreme low temperature environment to preliminarily form a cohesive external rigid crust thereon which temporarily contributes, in combination with a basal supporting structure, to the initial maintenance of the dimensional integrity of the extruded product. In a still narrower aspect, the subject invention includes the provision of a sherbet confection in the nature of simulated watermelon slices of semiellipsoid cross-sectional contour and compositely constituted of a plurality of chromatically distinct and separately flavored sherbert strata.

Among the advantages of the subject invention is the permitted commercial fabrication of selectively shaped, chromatically distinct stratified sherbet confections. A further advantage is the permitted fabrication of composite sherbet confections that are distinctive in character and aesthetically pleasing to both the eye and taste. A still further advantage of this invention is the provision of composite stratified sherbet confections selectively formed of chromatically distinct strata to present cognizable patterns for the purposes of both decoration and product identification.

A primary object of this invention is the provision of a method of forming selectively shaped, chromatically distinct stratified sherbet confections.

Another primary object of this invention is the provision of novel stratified sherbet confections compositely formed of selectively shaped and chromatically distinct strata in the nature of cognizable patterns of distinctive character.

Other objects and advantages of the invention will become apparent from the following portions of this specification and from the appended drawings which illustrate, in accord with the mandate of the patent statutes, the essentials of the fabrication method and a presently preferred product that incorporates the principles of this invention.

DETAILED DESCRIPTION OF THE INVENTION

Figure 1A:
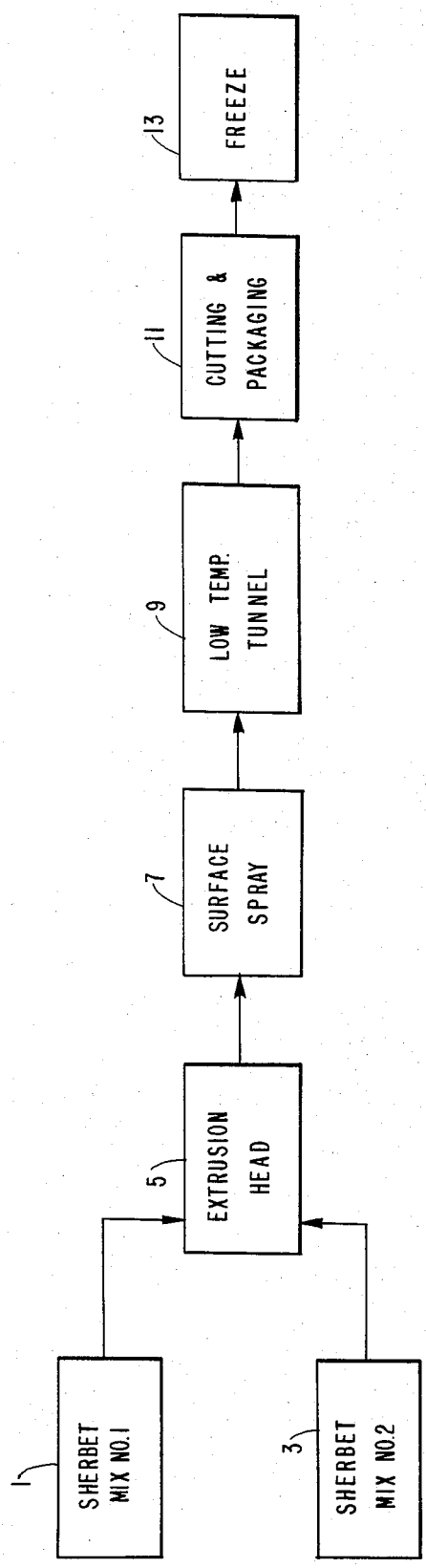
FIG. 1A is a simplified block diagram schematically indicative of the steps employed in the practice of the invention.

Referring initially to FIG. 1A there is provided at least a pair of premixed sherbets 1 and 3, preferably of chromatically distinct character and having differing flavor. Such mixes, in partially prefrozen character and at about the lowest temperature at which delivery and extrusion can be effected are compositely introduced into a multichambered extrusion head 5 that is selectively configured in accord with the contour dictates of the product to be fabricated. Such chromatically distinct and partially prefrozen sherbet mixes 1,3 are delivered conjointly from the chambers of the extrusion head 5 in the form of a unitary composite internally interfacially engaged product of selective external contour and having a plurality of chromatically distinct cross-sectional strata.

As the composite stratified sherbet emerges from the extrusion head 5, its exposed surfaces are preferably immediately sprayed with water, as at 7, as the extruded product is rapidly introduced into a low temperature environment 9, in the order of −140° F. or less, as by subjection to a spray of liquid nitrogen. Such exposure immediately results in the formation of a rigid frozen external crust thereon which functions as a structural shell that renders the extruded product essentially self supporting, both during its continued exposure to the low temperature environment 9, where further internal rigidity is attained, and for transport downstream to cutting and packaging operations 11 preparatory to final freezing 13 to form a finished product.

The product which emerges from the foregoing processing steps is a selectively shaped extruded stratified sherbet confection having a plurality of chromatically distinct strata.

Figure 5:
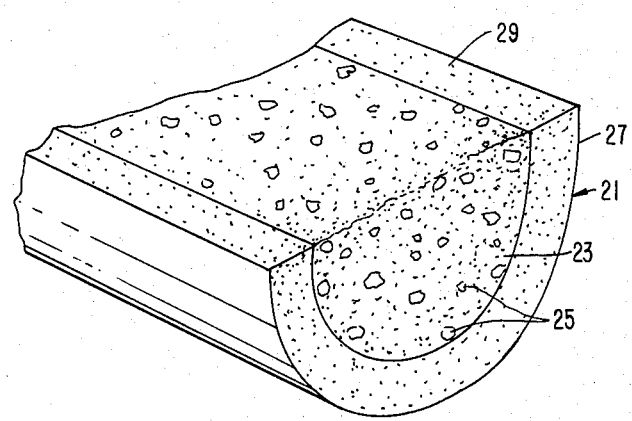
FIG. 5 is an oblique view of a presently preferred composite sherbet product formable in accord with the teachings of the invention.

FIG. 5 illustrates the presently preferred construction of a composite sherbet confection in the nature of a simulated piece of watermelon that is readily produced by the practice of the herein disclosed method. Such simulated piece of watermelon 21 is of general semiellipsoid configuration whose core strata 23 is formed of a pink or reddish hued sherbet with a watermelon flavor and which is randomly impregnated with chocolate chips 25, simulating watermelon seeds. The core strata 23 is concentrically semi-surrounded by a stratum comprised of light colored sherbet, preferably lemon flavored, and an outer coating 27 of frozen green colored water, the latter elements being simulative of the outer or rind portion of a watermelon. As is readily apparent, the overall visual effect is of an appropriately colored half round section of watermelon with chocolate chips distributed therein to visually simulate watermelon seeds.

Figure 1B:
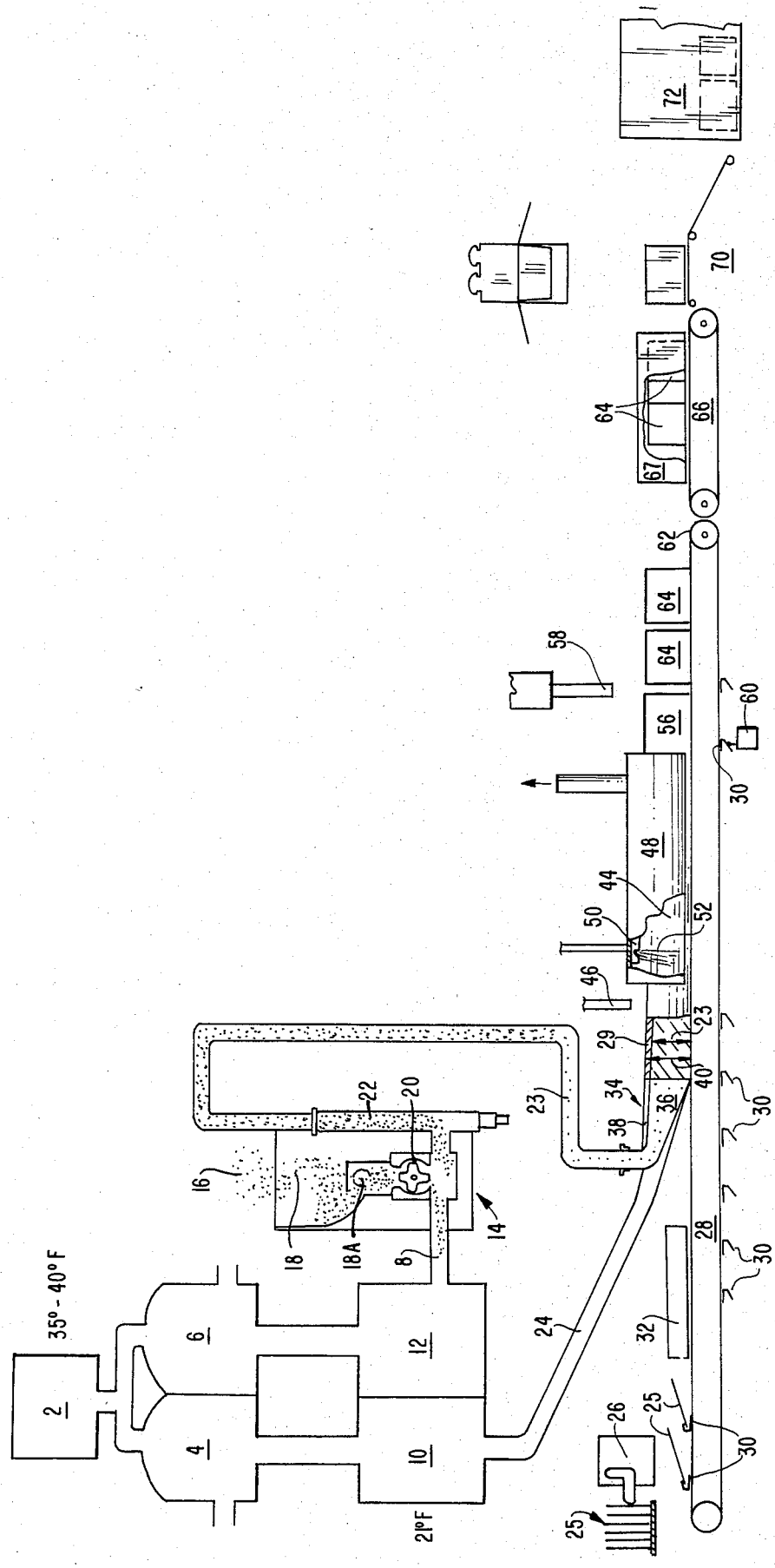
FIG. 1B is a schematic diagram indicative of the sequence of steps employed in the fabrication of the product illustrated in FIG. 5.
Figure 3:
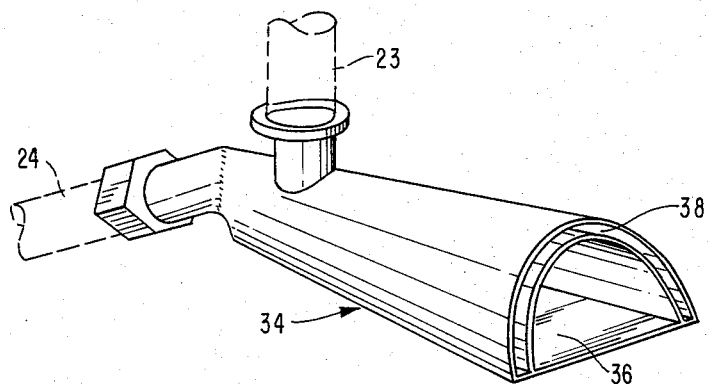
FIG. 3 is an oblique view of the extrusion head.
Figure 4:
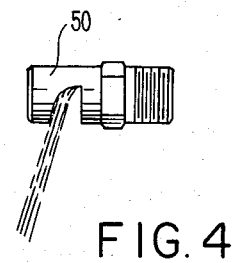
FIG. 4 is a side elevation of a liquid nitrogen spray nozzle.

FIG. 1B schematically illustrates, in somewhat greater detail, the steps employed in the fabrication of the preferred product illustrated in FIG. 5. As there depicted, a liquid sherbet base mix is prepared in a mixing tank 2 at a temperature of between 35° to 40° F. A preferred sherbet base mix for a 1000 gallon batch weighing 9.6 pounds per gallon, suitably comprises:

Cream—430 lbs., containing 172 lbs. of butterfat and 23 lbs. of nonfat milk solids;
Skim condensed milk—780 lbs., containing 265 lbs. of nonfat milk solids;
Cane syrup—2562 lbs., containing 1747 lbs. of cane sugar solids;
Corn syrup—1208 lbs., containing 965 lbs. of corn sugar solids;
Stabilizer—45 lbs. suitably Sherbilizer-Five Star (believed to be a mixture of guar gum mono- and diglycerides, carob bean gum, gum caraya, disodium phosphate, and pectin);
Disodium phosphate—5 lbs.;
Water—4570 lbs.

Such liquid sherbet base mix is pumped into two separate flavoring tanks 4 and 6, suitably Mix 'N Flavor Tanks as made by Crepaco Inc. of Chicago, Ill. 70631. In tank 4, the other ingredients needed to form an uncolored lemon flavored sherbet are added. Suitable ingredients, in quantities appropriate for forming a 500 gallon batch, include:

Sherbet base mix—500 gallons;
Lemon puree—150 lbs.;
Oil of lemon—3½ fl. oz.;
Alginate, suitably Kelcoloid LVF—1 lb. (believed to be a propylene glycol alginate and made by Kelco Co. of San Diego, California).

To the liquid sherbet base mix disposed in the second flavor tank 6 is added the ingredients needed to form a pinkish watermelon flavored sherbet. Suitable ingredients, in quantities appropriate for a 500 gallon batch, include:

Sherbet base mix—475 gallons;
Watermelon flavor—160 fl. oz. (presently preferred is an artificial and natural watermelon flavor made by the Flavor Division of Hercules, Inc. of Middletown, N. Y.);
50% citric acid solution—260 fl. oz.

After thorough mixing, for at least 15 minutes, colorants are added thereto. Suitable colorants to provide a simulated reddish watermelon pulp color include:

85 fl. oz. of Red #3 solution at a concentration of 4 oz. of F.D.&C Red #3 per gallon of water; and
95 fl. oz. of Red #40 solution at a concentration of 4 oz. of F.D.&C Red #40 per gallon of water.

Mixing is continued until a homogeneously colored mix is obtained.

Such flavored and appropriately colored sherbet from each of the flavor tanks 4 and 6 is then moved into separate compartments 10, 12 of a conventional ice cream freezer, such as the continuous freezer Model KM-340 of Crepaco, Inc. Both the lemon flavored sherbet in compartment 10 and the watermelon flavored sherbet in compartment 12 are there reduced to a temperature of about 21° F. which renders the sherbet partially frozen.

The watermelon flavored sherbet is then pumped from freezer 12 through a pipe 8 to a conventional ingredient feeder 14 such as a Model S-420 feeder from Crepaco, Inc.

Chocolate chips 16 are added to the hopper 18 of the ingredients feeder 14, and fed by means of an auger 18A. A metering starwheel 20 introduced regulated quantities of the chocolate chips 16 into the stream of sherbet from pipe 8. The now chip impregnated sherbet then flows up a conventional mixing tube assembly 22 containing an elongated multibladed auger-like propellor which distributes the chips randomly throughout the sherbet.

After being so prepared, the chip impregnated reddish colored sherbet is introduced into one of the chambers in extrusion head 34 through pipe 23. Concurrently therewith the lemon flavored sherbet is introduced into the other chamber in extrusion head 34 via pipe 24.

Figure 2:
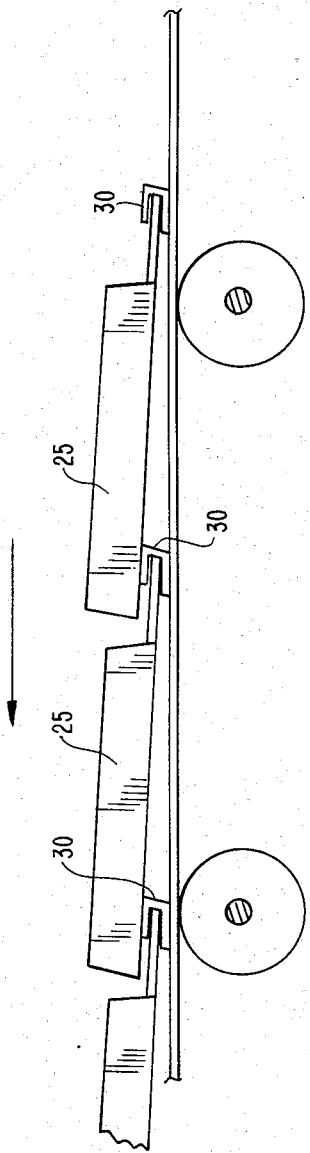
FIG. 2 is a side elevation of a section of the conveyor belt.

Concurrently with the foregoing flow of chromatically distinct sherbet, a page feeder 26 removes selectively shaped cardboard blanks 25 from supply stack thereof and deposits them upon a conveyor 28 with the leading edge of each succeeding blank partially overlying the trailing edge of the previous one. Each blank 25 is engaged by aluminum channels 30 affixed to every third conveyor belt link 31 as detailed in FIG. 2 for positive displacement therewith.

The conveyor belt 28 advances the blanks 25 through guide rails 32 which operate to fold flaps on either side of each blank 25 along prescored lines in a conventional manner. Continued advance of the conveyor belt 28 introduced each blank 25 under the delivery end of the dual chambered extrusion head 34.

The lemon flavored and watermelon flavored sherbets are conjointly delivered by the extrusion head 34 in the form of a unitary internally interfacially engaged composite product 40 of semiellipsoidal external contour and comprising two chromatically distinct cross-sectional strata. As previously described, the semiellipsoidal stratum 23 forming the watermelon core is comprised of the reddish hued and watermelon flavored sherbet having the chocolate chips 25 distributed therein. Such core portion is delivered flat side down and curved side up by the inner chamber 36 of extrusion head 34 onto the blanks 25 supported on the conveyor belt 28. Concurrently therewith an annular concentrically semi-surrounding stratum 29 is comprised of the light hued lemon flavored sherbet delivered by the outer chamber 38 of extrusion head 34. As is now apparent each terminus of stratum 29 rests upon and is supported by the blank and the inner concave surface thereof is disposed in contiguous interfacial engagement with the external curved side of the inner watermelon flavored stratum 23.

The continued advance of conveyor belt 28 serves to immediately advance the extruded composite product 40 beneath a spray head 46, which coats the exposed surface with dark green colored water. The spray head 46 is disposed closely adjacent to the delivery side of the extrusion head 34.

A suitable composition for this colored spray water is a mixture of about 3.0 grams of 91% F.D.&C Blue #1 dye and 45.5 grams of a yellow dye such as a mixture of annatto and turmeric such as AT-130W made by Chris Hansen Laboratory, Inc. of Milwaukee, Wisconsin, and mixed with 5 gallons of cold water thoroughly to dissolve the colors. The colored solution is then strained through a U.S.A. Standard Testing Sieve #100 mesh screen and added to a spray tank which feeds nozzle head 46.

The continuous advance of conveyor belt 28 immediately carries the now spray coated composite extrusion into the entry portion of a closely adjacent tunnel-like shroud 48 and under an assembly of spray heads 50 (detailed in FIG. 5). The spray heads 50 deliver a spray of liquid nitrogen 52 at a temperature of $-141°$ F. over the exposed outer surface of the advancing extruded product 44. The contact with said liquid nitrogen spray 52 immediately and markedly lowers the temperature of the exposed surface of the product and causes it to harden into a rigid frozen crust thereon. Such immediately formed rigid crust effectively forms a mold-like outer shell that prevents deterioration of the perimetric contour of the extruded product 44 as it advances through the tunnel 48. As will now be apparent, continued advance through the low temperature environment within the tunnel 48 results in further hardening of the inner portions of the extruded product and in the formation of a self-supporting and readily transportable structure.

The gaseous residue of the sprayed liquid nitrogen is drawn downstream within the shroud 48 to an exhaust pipe so as to subject the product 44 to a continuous low temperature environment as it is downstream on conveyor belt 28 within the shroud 48.

As the now further solidified product 56 emerges from the shroud 48 it is severed into sections of appropriate length at each downstream edge of each card 25 by a reciprocable sectioning blade 58 suitably comprised of a tensioned wire. Said blade is actuated by a microswitch 60 positioned beneath the conveyor belt 28 and sensitive to the position of the blank engaging channels 30 on each third link of the conveyor belt 28.

At its terminus 62, the conveyor belt 28 deposits each blank 25 bearing a severed and discrete product section 64 onto an auxiliary conveyor belt 66. The second belt 66 is adapted to move faster than the main belt 28, and thus operates to separate the sections 64 away from each other. The auxiliary belt 66 then carries the discrete sections through a conventional liquid nitrogen tunnel 67 such as made by AIRCO, where further exposure to low temperatures in the order of $-140°$-$150°$ F. further cools and solidifies each product section 68.

Following such further solidification, each product section is packaged as at 70, and placed in a conventional freezer 72 maintained at about $-40°$ F. until the core portion of the composite sherbet product is firmly frozen.

Having thus described my invention, I claim:

1. A method of forming selectively shaped and chromatically distinct stratified sherbet confections comprising the steps of
   independently feeding at least a first and a second chromatically distinct and partially prefrozen sherbet into a selectively shaped extrusion head,
   conjointly extruding said chromatically distinct and partially prefrozen sherbets from said extrusion head in the form of a unitary composite internally interfacially engaged product of selective external contour and having a plurality of chromatically distinct cross-sectional strata,
   spraying a thin water coating upon external exposed surfaces of said composite product,
   quickly thereafter reducing the temperature of the external exposed surfaces of said composite product by exposure to a spray of liquid nitrogen to form a rigid frozen crust thereon,
   and subsequently reducing the temperature of the remainder of said composite product to convert the same into a substantially solid self supporting transportable structure.

2. The method as set forth in claim 1 further including the step of severing said composite product having the rigid crust therein into discrete segments prior to reducing the temperature of the remainder of said composite product.

3. A method according to claim 1 in which the liquid nitrogen is sprayed within a tunnel-like shroud having the spray means near its upstream end and an exhaust means near its downstream end.

4. An extruded composite stratified sherbet confection comprising
   a first selectively contoured sherbet strata,
   a second selectively contoured sherbet strata chromatically distinct from said first strata,
   said first and second strata having a predetermined portion of the surfaces thereof complementally contoured and disposed in internal interfacial engagement to conjointly form a unitary composite sherbet product having chromatically distinct cross-sectional strata.

5. A composite sherbet as set forth in claim 4 wherein
   said first strata is of semiellipsoidal configuration and is of a first predetermined color,
   said second strata concentrically and uniformly surrounds the external curved surface portions of said first strata and is disposed in internal interfacial engagement therewith.

6. A composite sherbet product as set forth in claim 5 wherein
   said first strata is formed of reddish hued sherbet of watermelon flavor,
   said second strata is formed of light hued sherbet of lemon flavor, and further including
   dark green coloring matter included in the external exposed surface of said second strata,
   chocolate chip particles distributed within said first strata.

* * * * *